United States Patent Office 3,429,924
Patented Feb. 25, 1969

3,429,924
PROCESS FOR THE MANUFACTURE
OF C-NITROSOARYLAMINES
Harry L. Ellerbrook and Morley Morgana, Baton Rouge,
La., assignors to Gramor Chemicals, Inc., Baton Rouge,
La., a corporation of Louisiana
No Drawing. Filed Feb. 17, 1966, Ser. No. 528,075
U.S. Cl. 260—576                                    5 Claims
Int. Cl. C07c 111/00, 87/60

ABSTRACT OF THE DISCLOSURE

A process for rearranging N-nitrosodiarylamines to the corresponding p-nitrosodiarylamines to produce a product of extremely high purity and in substantially quantitative yield which comprises dispersing the starting material in a lower aliphatic alcohol and adding to this dispersion a solution of hydrogen chloride in the alcohol under carefully controlled conditions of temperature, i.e., 50° C. to 55° C., for a period between 0.5 and 7.5 hours and employing said hydrogen chloride in the molar proportions of between about 1:1 and 4:1 with respect to the nitrosodiarylamine being rearranged.

---

This invention relates to the manufacture of C-nitrosoarylamines by rearrangement of the corresponding N-nitroso compound. More particularly it relates to a process for the manufacture of C-nitrosodiarylamines.

Many techniques have been described for the preparation of C-nitrosoarylamines by rearrangement of corresponding N-nitrosoarylamines. Of the methods described most employ hydrogen chloride as the reagent in the presence of a dialkyl ether and sometimes in combination with an alcohol such as methyl or ethyl. Such systems of course represent considerable hazard when employed in large scale such as would be required in a commercial operation. Such hazards are encountered not only under reaction conditions but also during recovery of such solvent systems. More recently it has been suggested that less hazardous solvents such as the higher aliphatic alcohols could be employed, for example as described in U.S. 2,782,235. This reference even suggests that aqueous hydrogen chloride can be employed. However, as will be noted from a study of this process, the yields are not substantially quantitative, elaborate purification techniques are employed, recovery of solvent is cumbersome and efficiency, based on the amount of hydrogen chloride consumed, is extremely low.

It is, therefore, an object of this invention to provide a process for the manufacture of C-nitrosoarylamines by the rearrangement of the corresponding N-nitrosoarylamine in substantially quantitative yield by employing a very moderate excess of hydrogen chloride over that theoretically required and from which pure C-nitrosodiarylamine can be recovered without elaborate purification techniques.

These and other objects of this invention are accomplished by reacting in finely divided form N-nitrosodiarylamine suspended in an aliphatic alcohol with a solution of hydrogen chloride in said aliphatic alcohol, employing the hydrogen chloride in a molar ratio with respect to the N-nitrosodiarylamine of from about 4:1 to 1:1, while maintaining the temperature of the reaction mixture between about 15° C. and 50° C. for a period of time between about 0.5 and 10 hours. A particular feature of the present invention comprises the subsequent treatment of the slurry of the rearranged N-nitrosodiarylamine-hydrochloride with an aqueous solution of a mild alkali to neutralize the excess hydrogen chloride employed, removing the C-nitrosodiarylamine-hydrochloride product from this reaction system and neutralizing the chemically-bound hydrogen chloride at a pH of 5.0–7.5, providing thereby pure C-nitrosodiarylamine.

In the process described in U.S. 2,782,235 the conversion to caustic-soluble C-nitrosodiarylamine is on the order of 75 to 85 percent, even after sixteen hours reaction time. In contrast, the material prepared by the process of the present invention is, upon isolation by simple filtration techniques, completely soluble in sodium hydroxide, showing substantially quantitative conversions. While the reaction times in the processes of the prior art are about sixteen hours, good results are achieved by practicing the present invention in periods as short as 0.5 hour. A preferred reaction time is between about 0.5 and 7.5 hours.

While generally applicable to the rearrangement of N-nitrosoarylamines, as for example N-nitrosodiphenylamine, N-nitroso-N-methylaniline, N - nitroso-2,2$^1$-dimethyldiphenylamine, N-nitroso-2-methoxy-2$^1$ - methyldiphenylamine, N-nitroso-4 - cyclohexylaminodiphenylamine and N-nitroso-di-a-naphthylamine, the principal description of the present invention for purposes of clarity will be limited to the manufacture of p-nitrosodiphenylamine by rearrangement of N-nitrosodiphenylamine. An excellent method for the preparation of N-nitrosodiphenylamine suitable for use in the practice of this invention is described in U.S. 2,419,718.

It has been determined that high purity product and short reaction times are encouraged by employing finely divided N-nitrosodiphenylamine. One convenient method, which is a particular feature of the present invention, comprises introducing molten N-nitrosodiarylamine as a fine stream into the reaction medium, for example a lower aliphatic alcohol, which is maintained at a temperature below the melting point of the N-nitrosodiarylamine. Thus, for example, in the preparation of p-nitrosodiarylamine the N-nitrosodiphenylamine starting material can be melted and maintained at a temperature of about 70° C., at which temperature it is stable for a period of several hours, and introduce it to an agitated reactor containing n-butyl alcohol whereupon the N-nitrosodiphenylamine solidifies on contact in extremely fine particles. The butyl alcohol has quickly reached a solubility equilibrium, perhaps containing sufficient dissolved N-nitrosodiphenylamine to enhance the subsequent arrangement. The insolubility of most N-nitrosodiarylamines in the alcohol medium may contribute to the requirement for long reaction times and incomplete rearrangement if the above technique is not employed. Somewhat the same effect may be obtained by dissolving at the same temperature the N-nitrosodiphenylamine in alcohol and cooling it to cause crystallization. However, the first mentioned technique is preferred as it apparently provides smaller particles or more active surfaces.

It has been observed, upon subsequent treatment of the finely divided N-nitrosodiarylamine with hydrogen chloride, that during the first part of the addition of said hydrogen chloride, or at some later period during the reaction, substantially all of the solid goes into solution accompanied by a pronounced color change and followed by a reprecipitation upon further additions of hydrogen chloride and the establishment of the final typical color of the hydrochloride of the resulting C-nitrosodiarylamine.

A typical example of the process of this invention employing anhydrous hydrogen chloride is as follows, wherein all parts and percentages are by weight:

EXAMPLE I

From a steam heated weigh tank 200 parts of N-nitrosodiphenylamine at a temperature of 70° C. was introduced as a fine stream to 180 parts of n-butanol contained in a glass-lined reactor. This reactor was equipped with an efficient agitator, means for cooling the reaction charge, means for determining the temperature and means for addition of liquids. During the addition of the molten N-nitrosodiphenylamine the butanol was cooled and agitated. The resulting finely divided slurry of N-nitrosodiphenylamine was cooled to a temperature of 25° C. and a solution of 53.4 parts of anhydorus hydrogen chloride in 180 parts of n-butanol was added, while cooling and stirring, during a period of fifteen minutes. The stirred mixture was maintained at a temperature of 23 to 30° C. for a period of 4.5 hours. After about 2 hours the tan slurry appeared to become a solution and subsequently a finely divided brick-red precipitate of p-nitrosodiphenylamine-hydrochloride formed. At the end of the 4.5 hour reaction period the slurry was filtered and washd with 180 parts of butanol. The filter cake was immediately reslurried in 200 parts of water in an open vessel equipped with an efficient agitator. To this slurry was added sufficient 5 percent sodium carbonate solution to produce a slurry having a pH of 6.5. The free p-nitrosodiphenylamine was filtered and washed with 1000 parts of hot water. The product, 200 parts, had a melting point of 143–144° C., was completely soluble in 35 percent sodium hydroxide and gave a clear yellow solution in acetone. Impure p-nitrosodiphenylamine gives a purple color when dissolved in acetone and an insoluble residue remains on treatment with caustic.

In a series of preparations in accordance with the foregoing Example I, p-nitrosodiphenylamine was produced employing different lower aliphatic alcohols, varying reaction times, varying reaction temperatures, and varying molar ratios of hydrogen chloride to N-nitrosodiphenylamine (NNDA). The results are summarized in Table I.

TABLE I

| Mole ratio, HCl/NNDA | Reaction time, hrs. | Reaction temp., ° C. | Product Melting point, ° C. | Alcohol |
|---|---|---|---|---|
| 1:5 | 0.5 | 25 | 86 | n-Butanol. |
|  | 1.5 |  | 122 |  |
|  | 2.0 |  | 141 |  |
|  | 2.5 |  | 143 |  |
|  | 6.0 |  | 143 |  |
|  | 7.5 |  | 143 |  |
| 1:5 | 0.5 | 45 | 142 | n-Butanol. |
|  | 2.0 |  | 141 |  |
|  | 2.5 |  | 129 |  |
| 1:5 | 1.0 | 39 | 137 | n-Butanol. |
|  | 2.5 |  | 141 |  |
|  | 5.5 |  | 143 |  |
| 1:05 | 1.0 | 31 | 142 | n-Butanol. |
|  | 3.5 |  | 143 |  |
|  | 6.5 |  | 140 |  |
|  | 8.5 |  | 139 |  |
| 2:1 | 1.0 | 49 | 144 | Iso-butanol. |
|  | 6.5 |  | 144 |  |
|  | 7.0 |  | 136 |  |
| 2:1 | 0.5 | 42 | 140 | 2-butanol. |
|  | 1.0 |  | 142 |  |
|  | 7.5 |  | 140 |  |
|  | 8.5 |  | 135 |  |
| 2:1 | 1.0 | 40 | 138 | i-Propanol. |
|  | 2.0 |  | 141 |  |
|  | 2.5 |  | 143 |  |
|  | 6.0 |  | 144 |  |

From the foregoing, it can be seen that the melting point of the product can be employed as a sensitive indicator of the proper reaction time under varying conditions of temperature, mole ratio and alcohol employed. Generally speaking, a melting point from 140 to 143° C. is considered indicative of a satisfactory product. It is also evident that in the presence of excess hydrogen chloride a degradative reaction occurs resulting in lowering the melting point of the product after reaction is complete. Therefore, it is important to neutralize or deactivate by water dilution the excess hydrogen chloride at the proper time.

The rearranged product, for example the hydrochloride of p-nitrosodiphenylamine, can be processed according to the procedures of the prior art with good results. Thus, the slurry of the hydrochloride in the alcohol system can be treated with sufficient sodium hydroxide solution to neutralize free excess hydrogen chloride and that bound to the amino nitrogen. The resulting free p-nitrosodiphenylamine remains suspended as a solid in the neutralization mixture and can be removed by filtration, centrifugation and the like. By this technique a product of purity adequate for most purposes can be be obtained. However, to obtain product of highest purity a process which is also a feature of this invention can be employed wherein careful control of neutralization condition sis employed. Thus, in a preferred embodiment, excess hydrogen chloride is first neutralized with a mild alkali such as a solution of sodium carbonate, but insufficient in amount to neutralize the p-nitrosodiphenylamine-hydrochloride. There results a three phase system comprising an aqueous solution of sodium chloride and an alcohol suspension of p-nitrosodiphenylamine-hydrochloride. The advantage of this series of operations resides in providing neutral, non-corrosive streams for subsequent filtration and solvent recovery. However, it will be seen that there is thus provided two aqueous streams containing small but economically significant amounts of dissolved alcohol, as well as an alcohol suspension of the free amine containing a certain amount of dissolved water. Upon filtration of the product from this system and subsequent washing, it is difficult to remove traces of water-insoluble alcohol adhering thereto.

A preferred series of operations therefore comprises a feature of the present invention. The reaction slurry comprising the alcohol medium, suspended p-nitrosodiphenylamine-hydrochloride and excess hydrogen chloride is first treated with sufficient aqueous sodium carbonate to neutralize the excess hydrogen chloride. This three component system, as described in the foregoing, is then passed through a centrifuge wherein, because of the gravity differentials, the amine hydrochloride passes into the water phase and is wetted thereby, providing an effluent from the centrifuge of the two liquid phases and a cake which can be further washed with water and is substantially alcohol-free. This cake is then re-slurried in water and treated with agitation with an aqueous solution of sodium carbonate to a pH of between about 5.0 and 7.5, and the resulting p-nitrosodiphenylamine can then be recovered by conventional filtration techniques. This provides an aqueous solution of sodium chloride from said last filtration free of expensive alcohol which can be disposed of, and from the centrifugation there results two liquid phases—the organic phase of which can be sent to a rectifier column for recovery of alcohol of any desired water content as still bottoms, and an aqueous phase which can be fed to a stripper column for recovery of an alcohol azeotrope overhead, the overhead from both columns being combined, the organic phase being returned to the rectifier column and the aqueous phase being returned to the stripping column.

To illustrate the effect of the final pH after neutralization of the hydrochloride to the free amine, a series of neutralizations was conducted on a single sample of p-nitrosodiphenylamine-hydrochloride. The melting points shown in Table II were obtained on a Fisher-Johns melting point apparatus and include the temperature at which some of the crystals begin to melt. This is considered a more sensitive measure of purity than the final temperature. The temperatures in the first column were obtained after drying the sample at room temperature in a vacuum, while the stability is demonstrated in the second column, showing the melting point after heating for fifteen hours at 50° C. in a vacuum.

TABLE II

| pH | Melting point, ° C. | |
|---|---|---|
| | Initial | Vacuum, 50° C., 15 hrs. |
| 5.0 | 142–144 | 142–143 |
| 5.5 | 143–145 | 141–142 |
| 6.0 | 143–145 | 141–142 |
| 6.5 | 141–144 | 141–143 |
| 7.0 | 142–144 | 140–143 |
| 7.5 | 141–143 | 140–143 |
| 8.0 | 141–144 | 139–141 |
| 8.5 | 141–144 | 137–140 |
| 9.0 | 140–144 | 137–139 |

A principal utility of the p-nitrosodiarylamines produced by the process of this invention is in the manufacture of antiozonants of the N-phenyl-N$^1$-alkyl-p-phenylenediamine type by catalytic reductive alkylation. It has been determined that p-nitrosodiphenylamine produced by this process, and without further purification, provides substantially quantitative results in such reductive alkylations, with long catalyst life. On the contrary, use of commercially available materials produced by prior art processes results in low yields, presumably caused by catalyst poisons present as impurities. Furthermore, the storage stability of p-nitrosodiphenylamine produced by this process, both as the free-flowing material containing 25–35 weight percent water, and the anhydrous material is much greater than that heretofore available.

The alcohols employed as a dispersant for the N-nitrosodiphenylamine reactant and as a carrier for the hydrogen chloride are lower aliphatic alcohols, and of these, alcohols having three to six carbon atoms are preferred. Thus propyl alcohol, isopropyl alcohol, n-butanol, sec.-butanol, isobutanol, and the corresponding amyl and hexyl alcohols can be employed. In general, alcohols which do not esterify with hydrogen chloride in the absence of a catalyst are employed. While methanol and ethanol are satisfactory, closer control of reaction conditions are required. The proportions of alcohol are not critical but from an economic standpoint, weight ratios of alcohol to N-nitrosodiphenylamine of 1:1 to 10:1 are employed. Concentrations of hydrogen chloride to alcohol of 5 to 35 weight percent are satisfactory.

Moderate amounts of water can also be tolerated. For example, in a preparation according to the procedure of Example I, n-butanol containing 10 weight percent water, and hydrogen chloride in a mole ratio of 2.25:1 with respect to the amine, gave a quantitative yield of pure p-nitrosodiphenylamine in a reaction period of 2 hours, at a reaction temperature of 48° C.

Having thus described the process of this invention, it is not intended to be limited except in terms of the following claims.

We claim:
1. A process for the manufacture of [C] p-nitrosodiarylamine by rearrangement of the corresponding N-nitrosodiarylamine which comprises finely dispersing N-nitrosodiarylamine as a solid in a lower aliphatic alcohol, adding to said dispersion a solution of hydrogen chloride in said lower aliphatic alcohol while maintaining the reaction mixture at a temperature of between about 15° C. and 50° C., maintaining the resulting mixture at said temperature for a period of between about 0.5 and 7.5 hours, said hydrogen chloride and said N-nitrosodiarylamine being in the molecular proportions of between about 1:1 and 4:1, and recovering [C] p-nitrosodiarylamine by neutralization.

2. The process of claim 1 wherein said N-nitrosodiarylamine is N-nitrosodiphenylamine.

3. The process of claim 1 wherein said lower aliphatic alcohol contains one to six carbon atoms.

4. The process of claim 1 wherein said dispersing step comprises introducing a molten stream of N-nitrosodiphenylamine to stirred butyl alcohol, and wherein said hydrogen chloride is dissolved in butyl alcohol and added while maintaining the reaction mixture between about 15 and 25° C., said hydrogen chloride being in molecular proportion to said N-nitrosodiphenylamine between about 1.05 and 4:1, maintaining the reaction mixture at a temperature of about 30° C. for a period of about 4.5 hours and recovering p-nitrosodiphenylamine.

5. The process of claim 4 further characterized in that p-nitrosodiphenylamine is recovered by treating the reaction mixture with a solution of sodium carbonate sufficient to neutralize the excess hydrogen chloride, followed by centrifugation of the resulting three phase system and treating the solid p-nitrosodiphenylamine hydrochloride so obtained with aqueous sodium carbonate solution to a resulting pH of between about 5.0 and 7.5, and recovering p-nitrosodiphenylamine.

References Cited

UNITED STATES PATENTS 2,782,235   2/1957   Lantz.

CHARLES B. PARKER, *Primary Examiner.*

PATRICIA C. IVES, *Assistant Examiner.*

U.S. Cl. X.R.

260—571, 577